(12) United States Patent
Lord

(10) Patent No.: US 7,610,880 B2
(45) Date of Patent: Nov. 3, 2009

(54) ANIMAL CONTROL DEVICE

(76) Inventor: Anthony L. Lord, 1563 N. Doheny Dr., Los Angeles, CA (US) 90069

( * ) Notice: Subject to any disclaimer, the term of this patent is extended or adjusted under 35 U.S.C. 154(b) by 0 days.

(21) Appl. No.: 11/115,084

(22) Filed: Apr. 25, 2005

(65) Prior Publication Data

US 2006/0236955 A1    Oct. 26, 2006

(51) Int. Cl.
*A01K 27/00* (2006.01)

(52) U.S. Cl. ...................................... 119/794

(58) Field of Classification Search ......... 119/792–794, 119/856, 858, 863; 242/384.7, 385.4
See application file for complete search history.

(56) References Cited

U.S. PATENT DOCUMENTS

| | | | | |
|---|---|---|---|---|
| 870,784 | A * | 11/1907 | Huff | 119/794 |
| 2,889,807 | A * | 6/1959 | Beebe | 119/794 |
| 3,250,253 | A * | 5/1966 | Galin | 119/794 |
| 3,477,410 | A * | 11/1969 | Lettieri | 119/794 |
| 4,202,510 | A * | 5/1980 | Stanish | 242/384.7 |
| 4,328,766 | A * | 5/1982 | Deibert | 119/794 |
| 4,328,767 | A | 5/1982 | Peterson | |
| 4,856,726 | A * | 8/1989 | Kang | 242/384.7 |
| 4,964,370 | A | 10/1990 | Peterson | |
| 5,377,626 | A * | 1/1995 | Kilsby et al. | 119/796 |
| 5,816,198 | A | 10/1998 | Peterson | |
| 6,205,956 | B1 * | 3/2001 | Dickie et al. | 119/792 |
| 6,481,382 | B2 | 11/2002 | Cohn | |
| 6,581,547 | B1 | 6/2003 | Austin | |
| 6,694,922 | B2 * | 2/2004 | Walter et al. | 119/772 |
| 6,792,893 | B1 * | 9/2004 | Quintero et al. | 119/796 |

FOREIGN PATENT DOCUMENTS

GB    2029683 A  *  3/1980
GB    2114864 A  *  9/1983

* cited by examiner

*Primary Examiner*—Son T. Nguyen
(74) *Attorney, Agent, or Firm*—Mintz, Levin, Cohen, Ferris, Glovsky, and Popeo, P.C.

(57) ABSTRACT

Devices and methods for controlling an animal are disclosed. An animal control device includes a retractable leash assembly for being mounted to a collar or other harness. The retractable leash assembly has a retractable leash that is extendable from and retractable back to the collar via the retractable leash assembly. The retractable leash assembly includes a spool in a housing. The retractable leash is adapted to be wound around the spool in a retracted mode, and extendable from the spool in an extended mode.

10 Claims, 5 Drawing Sheets

ANIMAL CONTROL DEVICE

BACKGROUND

Many animals, such as dogs, cats or other pets, and even humans such as children, can be submitted to human control by a leash held by a user. Conventionally, an animal is provided with a collar or other strapped device, and a leash is attached to the collar when used to control the animal, and detached and stored on its own when unused.

Leashes are available in a variety of sizes and types. There are chain leashes, strap leashes, and cord leashes. Some leashes extend and retract from a hand-held device. However, conventional uses of leashes require that the leash be detached from an animal when not in use, leading to a possibility that the leash may be misplaced or lost, or that it is not available at certain critical times.

SUMMARY

This document describes devices and methods for controlling an animal. In one aspect, an animal control device includes a retractable leash for being connected to and extendable from a collar.

In another aspect, an animal control device includes a retractable leash assembly for being mounted to a harness and having the retractable leash. The retractable leash assembly may include a housing and a spool in the housing. The retractable leash is adapted to be wound around the spool in a retracted mode, and extendable from the spool in an extended mode.

In yet another aspect, an animal control device includes a collar, and a retractable leash assembly mounted to the collar. The retractable leash assembly has a retractable leash that is extendable from the collar and retractable back to the collar via the retractable leash assembly. The collar may be part of a harness.

These aspects yield several advantages, including not having to detach a leash from a harness or collar of an animal, and/or store the leash separately when not in use. The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
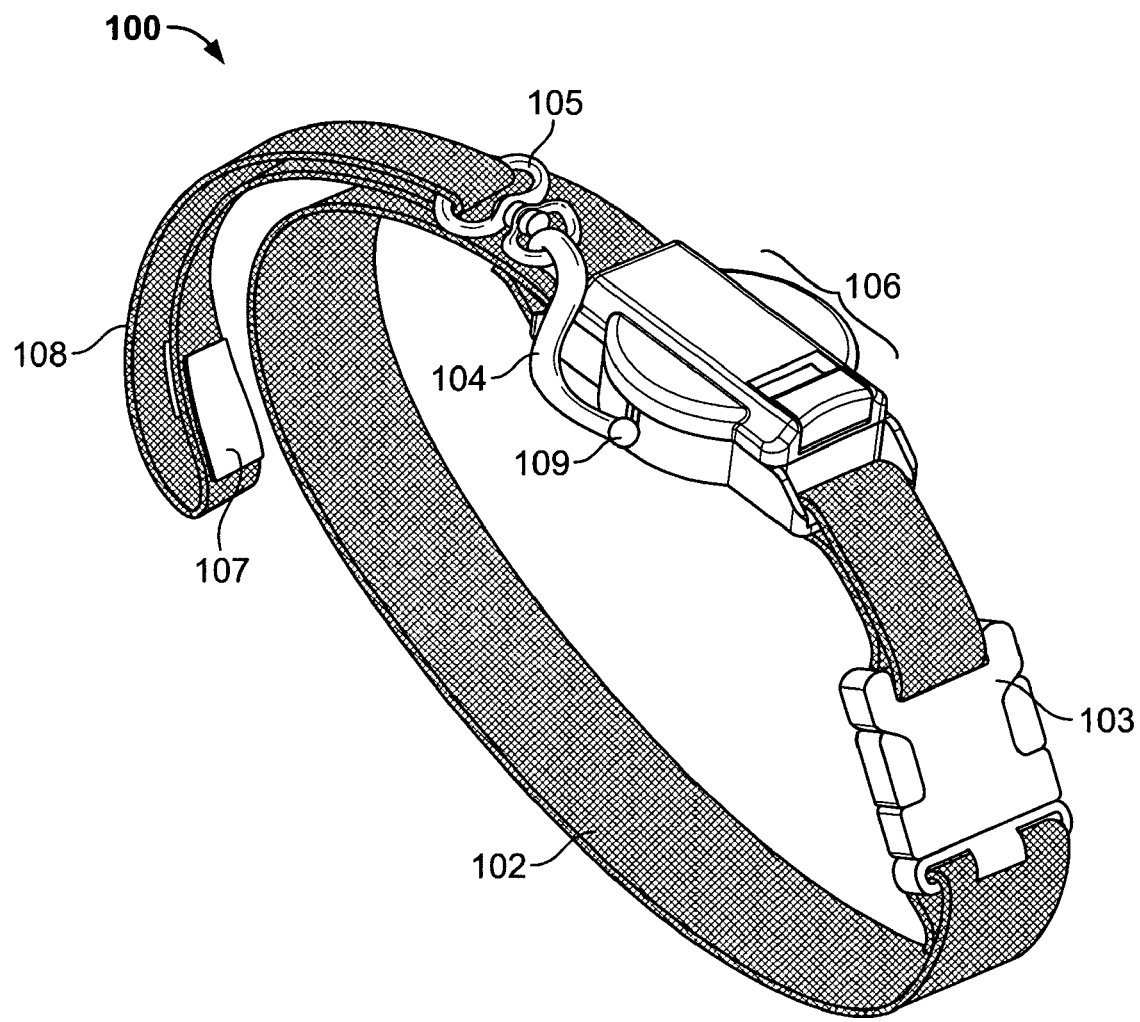
FIG. 1 shows an animal control device in accordance with one embodiment.

FIG. 1 shows an animal control device 100 in accordance with one embodiment. The animal control device 100 includes a collar 102 that is sized and adapted to be secured around an animal, and preferably the animal's neck. The animal could be a dog, a cat, a horse, a rodent, or other animal. The collar 102 may be formed of an elongated strap of a particular length, and include a securing mechanism 103 such as a buckle, clasp, snap, Velcro, or other mechanism to secure one end of the collar 102 to the other end. The collar 102 may be made of nylon, leather, plastic, metal, or any other suitably resilient material. The collar 102 is one type of harness that fits around a body part of the animal.

The animal control device 100 further includes a retractable leash 104 that is connected to and extendable from the collar 102. The leash 104 is connected with a retractable leash assembly 106 mounted on or otherwise connected with the collar 102. The leash 104 is disposed within the retractable leash assembly 106 in a retracted mode, and extends from the retractable leash assembly 106 in an extended mode. Accordingly, the retractable leash assembly 106 allows the leash 104 to be extended from and retracted back to the collar 102 or other harness to or on which the retractable leash assembly 106 is attached or mounted.

In one embodiment, the retractable leash assembly 106 is connected on opposing sides to the collar 102, in a configuration much like a watch and watch-band. The leash 104 can include a handle 108, such as a looped handle. The handle 108 can be connected to the leash 104 by a swivel connector 105, as shown in FIG. 1. Other configurations are possible. The leash 104 may also include a stop 109 provided along a length of the leash 104 to inhibit further retraction of the leash 104 into the retractable leash assembly 106. The leash 104 may range from 2 or less to 30 or more feet in length, and preferably 4 to 20 feet in length. It should be understood that the retractable leash assembly 106 can be provided separately from, and configured to be connectable to any type of collar 102 or harness.

An attachment mechanism 107 may be provided between the leash handle 108 and the collar 102 for temporarily attaching and storing the leash handle 108 against the collar 102 when the leash 104 is in a retracted position, i.e. when not extended and/or not in use. The attachment mechanism 107 can include Velcro, a snap, loop or other attachment components. Accordingly, the animal control device 100 provides a collar 102 with an integrated extendable leash 104 that dispenses with the need to store a leash separately from a collar, as well as the need to attach the leash to the collar each time it is used.

Figure 2A:
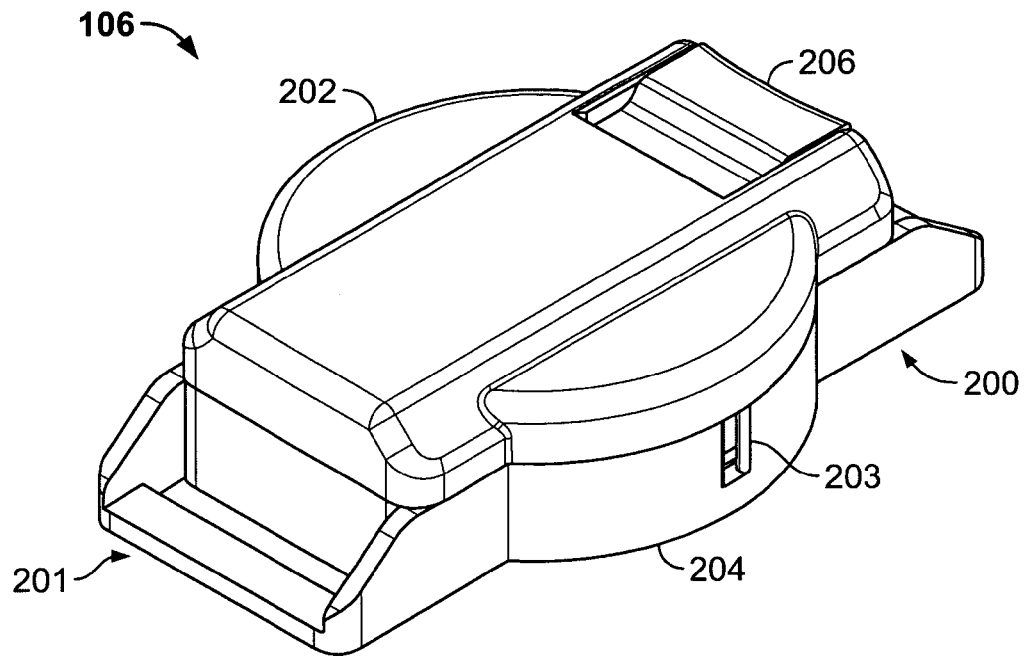
FIGS. 2A-2D illustrate various components of a retractable leash assembly according to an exemplary embodiment.

FIGS. 2A-2D illustrate various components of the retractable leash assembly 106 according to another exemplary embodiment. As shown in FIG. 2A, the retractable leash assembly 106 includes a housing 200. The housing 200 is preferably formed of a top case 202 mated to a bottom case 204. A release mechanism 206, such as a button, switch, latch or other mechanism, is integrated into the housing 200, preferably in the top case 202. The release mechanism 206 is adapted to release the leash 104 from an extended mode (i.e. when the leash 104 is extended from the collar 102) to a retracted mode (i.e. when the leash 104 is being retracted into the retractable leash assembly 106 toward the collar 102). The housing 200 further includes an opening 203 through which the leash 104 extends. The opening 201 is preferably formed in the bottom case 204. The housing 200 further includes a connection mechanism 201 for connecting to or mounting to a collar or harness. The connection mechanism 201 is preferably integrated with the bottom case 204.

Figure 2B:
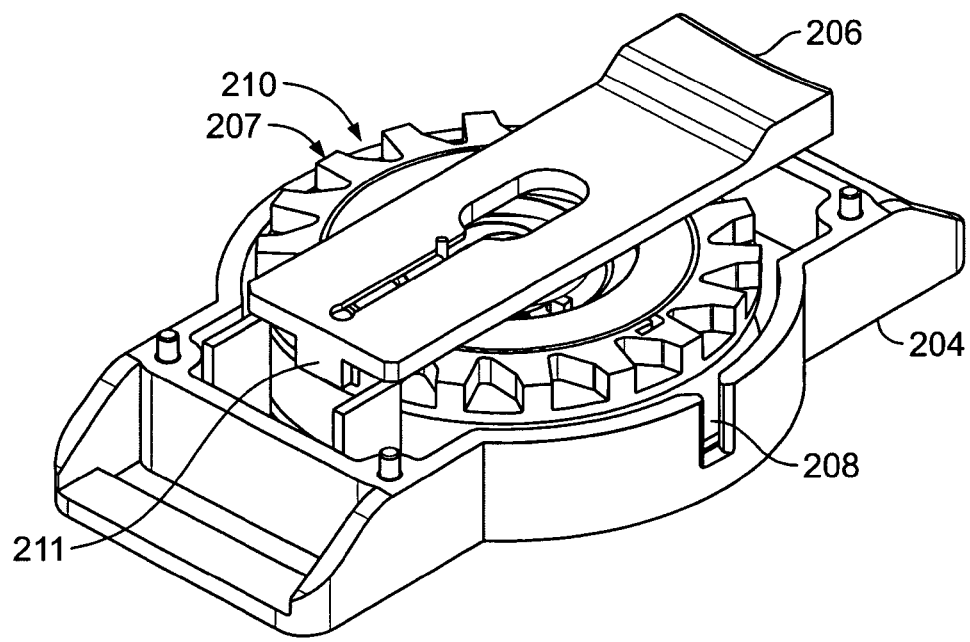

As shown in FIG. 2B, the retractable leash assembly includes a spool 208 disposed within the housing 200, which is preferably positioned within the bottom case 204 and configured to rotate about a central axis. The spool 208 is connected to and wound by the leash 104, particularly in the retracted mode (not shown in FIG. 2B), and from which the leash 104 is extendable in the extended mode. The spool 208 can include a number of detents 210 provided on an outer edge 207 of the spool 208.

The release mechanism 206 includes a pin 211 that is insertable into one of the of detents 210 of the spool 208 by user operation of release mechanism 206 to inhibit rotation of the spool 208. Removal of the pin 211 from one of the detents 210 releases the spool 208 to allow further rotation. In one embodiment, the release mechanism 206 includes a button or switch that, when activated (i.e. pushed) by a user, allows the leash 104 to extend from or retract back into the housing 200 of the retractable leash assembly, and that when deactivated (i.e. released) by a user, locks the leash 104 into its present length. Alternatively, the release mechanism 206 can include a button or switch that when activated (i.e. pushed) locks the leash 104 into its present length, and that when deactivated (i.e. released) allows free movement (extension or retraction) of the leash 104 relative to housing 200.

Figure 2C:
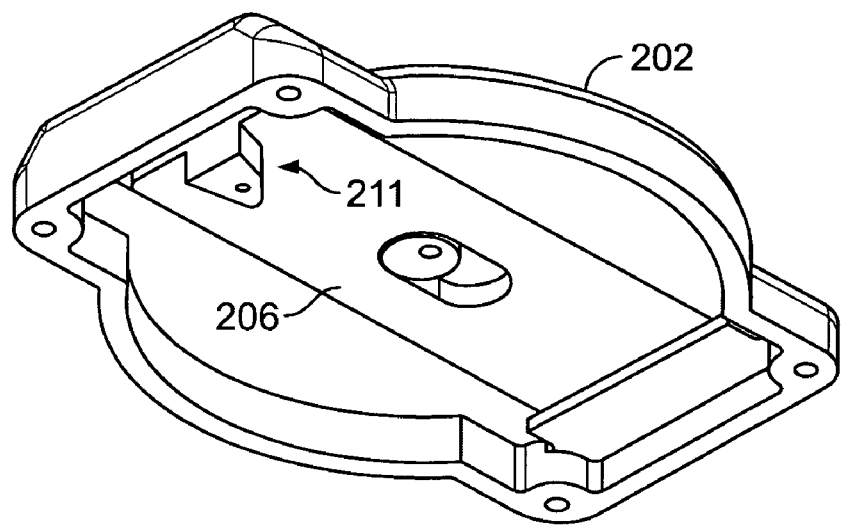
Figure 2D:
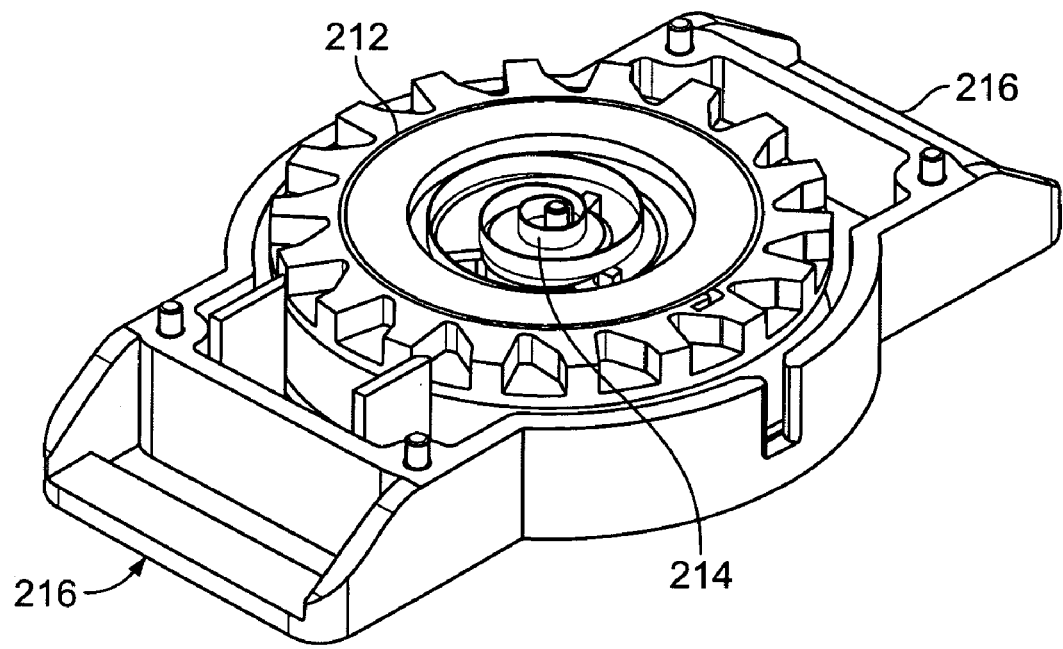

FIG. 2C is a perspective view of the top case 202 of the housing 200, illustrating cooperation of the release mechanism 206 with pin 211 and top case 202. FIG. 2D shows the spool 208 in cooperation with a spring 212 connected between the spool 208 and a spring arbor 214 provided with the bottom case 204. The spring 212 is preferably a coiled spring, and biases the spool 208 to the retracted position. Accordingly, extension of the leash 104 from the spool 208 increases tension in the spring 212, which tension is fully or nearly fully released by retraction and winding of the leash 104 back around the spool 208.

The connection mechanism 201 of the housing 200 can include two slats 216 for receiving the collar 102 or other strap. In an embodiment, the slats 216 are adapted to be threaded by the collar 102. Alternatively, each end of the collar 102 can be connected to the slats 216.

Figure 3:
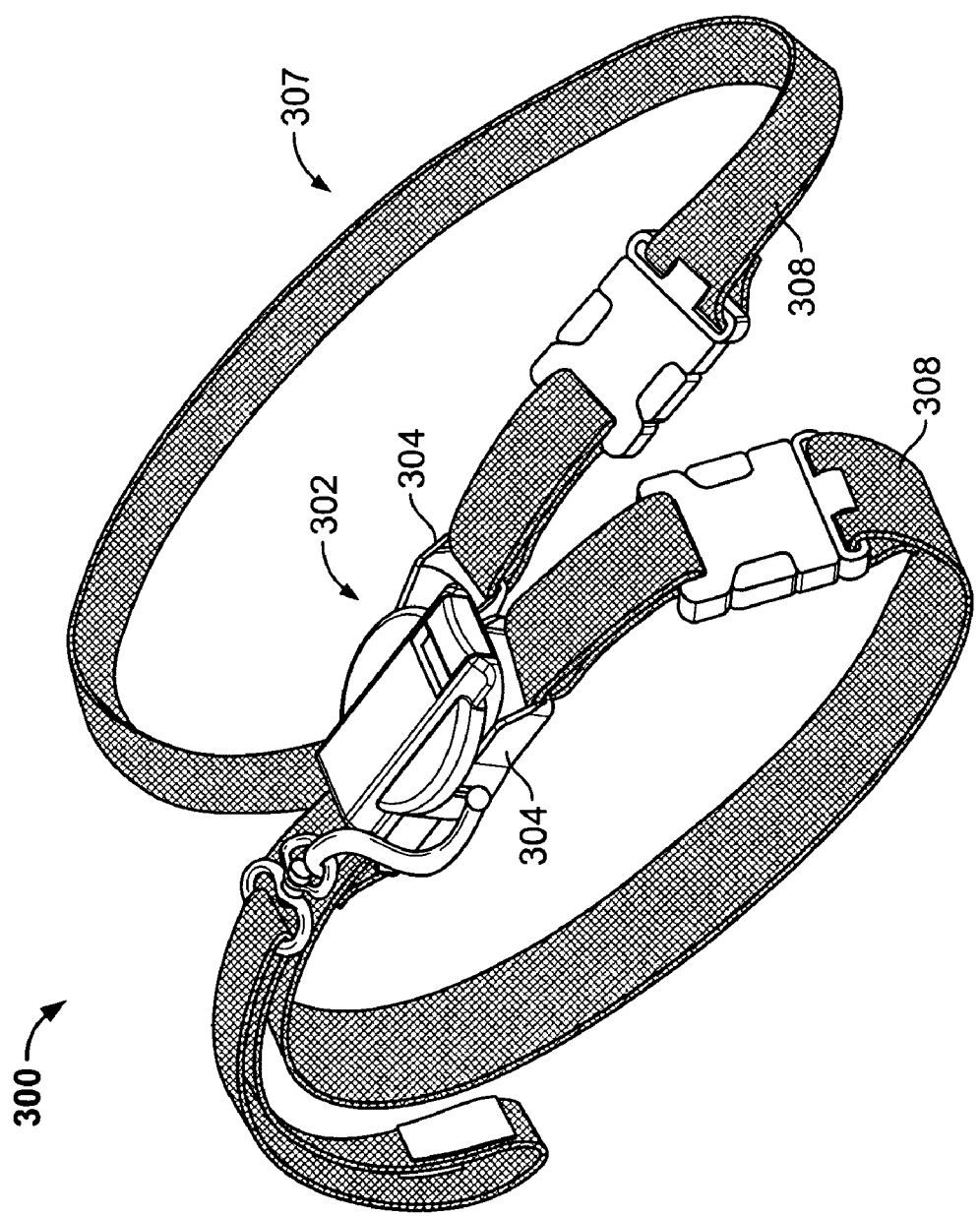
FIG. 3 shows an alternative animal control device and collar arrangement.

FIG. 3 shows an animal control device 300 in accordance with an alternative exemplary embodiment. The animal control device 300 includes a retractable leash assembly 302 that includes a number of connection mechanisms 304 that connect to a body harness 307. The body harness 307 is formed of one or more straps 308 or bands that fit around certain sections of an animal. For instance, one of the one or more straps 308 can be a collar. In the embodiment shown, the retractable leash assembly 302 is connectable to two straps 308. The straps 308 can be formed of leather, nylon, a metal chain, or other substantially rigid yet flexible material. Alternative, the body harness 307 can be formed of a rigid material.

Figure 4:
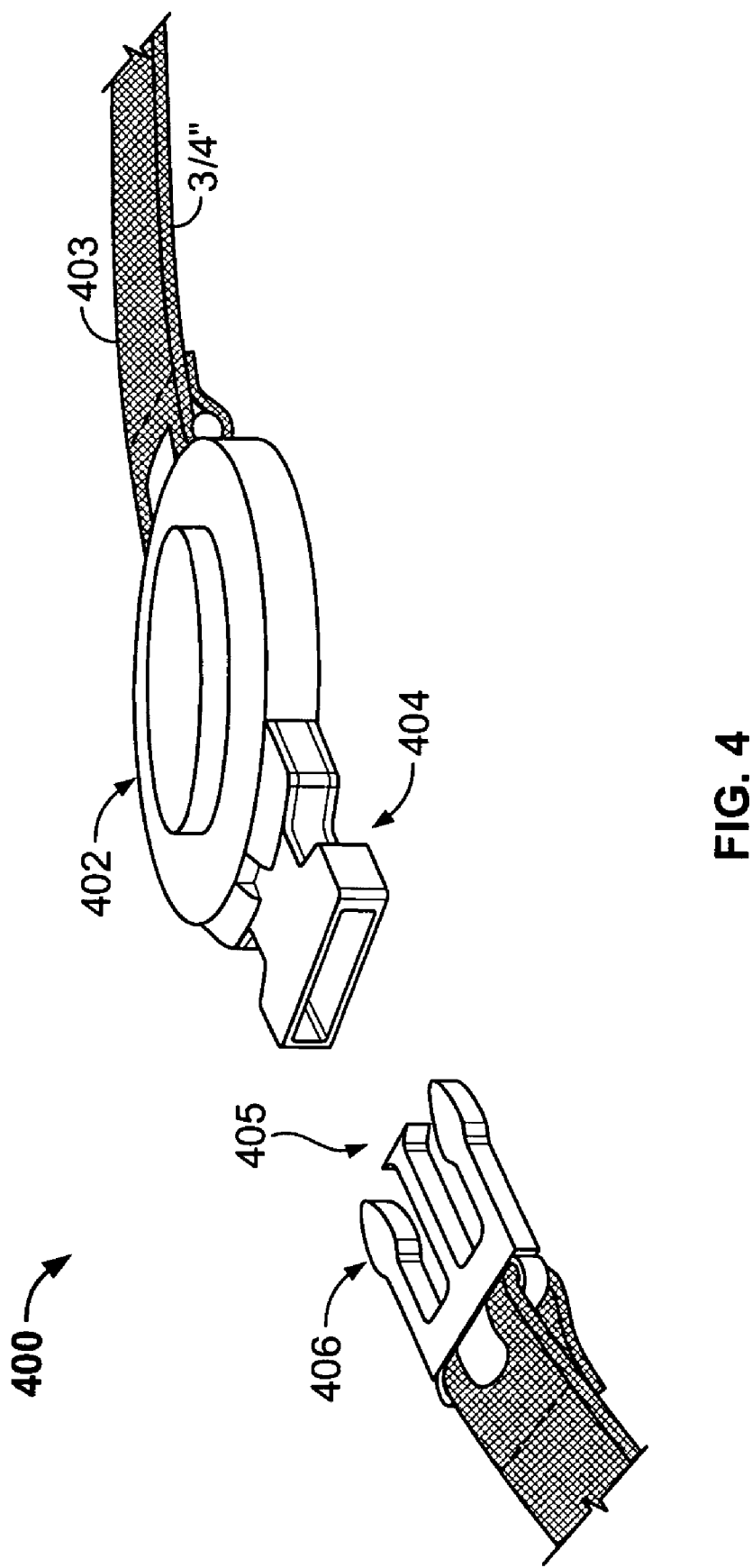
FIG. 4 shows an animal control device with one or more connectors.

FIG. 4 shows an animal control device 400 having a retractable leash assembly 402 that is adapted to be connected to a collar 403 or other strap via one or more connectors 405. In an exemplary embodiment, the connector 405 may include a clip having a female clip member 404 mounted to the retractable leash assembly 402 and a male clip member 406 connected to the collar 403. Alternatively, the retractable leash assembly 402 may include two male clip members 406 or two female clip members 404, for connecting to a complementary clip member of the collar 403. In still yet other embodiments, the retractable leash assembly 402 can be mounted to the collar 403 by a snap, buckle or any other connecting device.

Although a few embodiments have been described in detail above, other modifications are possible. Other embodiments may be within the scope of the following claims.

The invention claimed is:

1. An animal control device comprising:
 a collar having opposite ends; and
 a retractable leash assembly connected to the opposite ends of the collar, the retractable leash assembly comprising:
  a housing having a disk-shaped interior case, the disk-shaped interior case being defined by a radius and a height in which the radius exceeds the height such that the housing has a rounded shape and a low profile relative to the collar;
  two connectors extending laterally from opposite sides of the housing, each connector adapted to connect to one of the opposite ends of the collar;
  a disk-shaped spool mounted in the disk-shaped interior case, the disk-shaped spool including a spool portion disposed toward a bottom of the disk-shaped interior case and a detent portion stacked on the spool portion, the detent portion being defined by an outer edge having a plurality of detents arranged therein;
  a retractable leash connected to the spool portion of the disk-shaped spool through an opening in the housing, the retractable leash being wound around the spool portion of the disk-shaped spool in a retracted mode, and being unwound from the spool portion of the disk-shaped spool and extended from the housing in an extended mode; and
  a leash release mechanism comprising a button that is substantially flush with an outer surface of the housing, the button being connected with a flat, planar locking member that extends over the spool portion of the disk-shaped spool near a top of the disk-shaped interior case, the locking member terminating in a pin that extends downward toward the bottom of the disk-shaped interior case, the pin being insertable into and removable from one of the plurality of detents under control of the button to respectively engage and disengage the disk-shaped spool for locking and releasing the retractable leash in either the retracted mode or the extended mode.

2. An animal control device in accordance with claim 1, wherein the retractable leash includes a leash handle.

3. An animal control device in accordance with claim 2, further comprising an attachment mechanism for securing the leash handle to the collar in the retracted mode.

4. An animal control device in accordance with claim 1, wherein the retractable leash further includes a stop to inhibit further retraction of the retractable leash into the housing in the retracted mode.

5. An animal control device in accordance with claim 1, wherein the disk-shaped spool further includes a spring for biasing the spool to the retracted mode.

6. An animal control device in accordance with claim 1, wherein at least one of the connectors includes a slat that is threaded by the associated end of the collar.

7. An animal control device in accordance with claim 1, wherein each connector includes a slat that is threaded by the associated end of the collar.

8. An animal control device in accordance with claim 1, wherein the release mechanism respectively locks the retractable leash in, and releases the retractable leash from, the retracted mode or the extended mode.

9. An animal control device comprising:
 a collar having opposite ends;
 a housing having a disk-shaped interior case, the disk-shaped interior case being defined by a radius and a height in which the radius exceeds the height such that the housing has a rounded shape and a low profile relative to the collar;
 two connectors extending laterally from opposite sides of the housing, each connector connected to one of the opposite ends of the collar;

a disk-shaped spool mounted in the disk-shaped interior case, the disk-shaped spool including a spool portion disposed toward a bottom of the disk-shaped interior case and a detent portion stacked on the spool portion, the detent portion being defined by an outer edge having a plurality of detents arranged therein;

a retractable leash connected to the spool portion of the disk-shaped spool through an opening in the housing, the retractable leash being wound around the spool portion of the disk-shaped spool in a retracted mode, and being unwound from the spool portion of the disk-shaped spool and extended from the housing in an extended mode; and a leash release mechanism comprising a button that is substantially flush with an outer surface of the housing, the button being connected with a flat, planar locking member that extends over the spool portion of the disk-shaped spool near a top of the disk-shaped interior case, the locking member terminating in a pin that extends downward toward the bottom of the disk-shaped interior case, the pin being inserted into and removable from one of the plurality of detents under control of the button to respectively engage and disengage the disk-shaped spool for locking and releasing the retractable leash in either the retracted mode or the extended mode.

10. An animal control assembly device integrated with a collar having opposite ends, the assembly device comprising:

a housing having a disk-shaped interior case including a spring arbor disposed in the center of the disk-shaped interior case, the disk-shaped interior case being defined by a radius and a height in which the radius exceeds the height such that the housing has a rounded shape and a low profile relative to the collar;

two connectors extending laterally from opposite sides of the disk-shaped case, each connector adapted to connect to one of the opposite ends of the collar;

a disk-shaped spool mounted in the disk-shaped interior case, the disk-shaped spool including a spool portion disposed toward a bottom of the disk-shaped interior case and a detent portion stacked on the spool portion, the detent portion being defined by an outer edge having a plurality of detents arranged therein;

a retractable leash connected to the disk-shaped spool through an opening in the housing, being wound around the spool portion in a retracted mode, and being unwound from the spool portion and extended from the housing in an extended mode;

a coiled spring connected between an interior wall of the disk-shaped spool and the spring arbor, to bias the spool toward the retracted mode;

a leash release mechanism comprising a button that is substantially flush with an outer surface of the housing, the button being connected with a flat, planar locking member that extends over the spool portion of the disk-shaped spool near a top of the disk-shaped interior case, the locking member terminating in a pin that extends downward toward the bottom of the disk-shaped interior case, the pin being is inserted into and removable from one of the plurality of detents under control of the button to respectively engage and disengage the disk-shaped spool for locking and releasing the retractable leash in either the retracted mode or the extended mode.

* * * * *